United States Patent
Kizhnerman et al.

(10) Patent No.: US 7,119,828 B1
(45) Date of Patent: *Oct. 10, 2006

(54) SYSTEM AND METHOD FOR ESTABLISHING AND CONTROLLING AN ON-DEMAND TELECONFERENCE BY A REMOTE COMPUTER

(76) Inventors: M. Sean Kizhnerman, 11097 Circle Dr., Golden, CO (US) 80403; Mark Kizhnerman, 11097 Circle Dr., Golden, CO (US) 80403

( * ) Notice: Subject to any disclaimer, the term of this patent is extended or adjusted under 35 U.S.C. 154(b) by 516 days.

This patent is subject to a terminal disclaimer.

(21) Appl. No.: 10/423,693

(22) Filed: Apr. 25, 2003

Related U.S. Application Data

(63) Continuation-in-part of application No. 10/121,409, filed on Apr. 12, 2002.

(60) Provisional application No. 60/375,869, filed on Apr. 26, 2002, provisional application No. 60/283,870, filed on Apr. 13, 2001.

(51) Int. Cl.
*H04N 7/14* (2006.01)

(52) U.S. Cl. .............................. 348/14.08; 348/14.09; 709/204

(58) Field of Classification Search .. 348/14.01–14.09, 348/14.11, 14.12, 14.13; 379/202.01; 370/260, 370/261; 707/100, 1; 717/100; 709/204
See application file for complete search history.

(56) References Cited

U.S. PATENT DOCUMENTS 5,995,608 A * 11/1999 Detampel et al. ...... 379/205.01

* cited by examiner

*Primary Examiner*—Melur Ramakrishnaiah

(57) ABSTRACT

A teleconference network, using multiple teleconference bridges and a data network is disclosed. A first telephone network transmits, in one or more frames, a voice transmission generated by a first telecommunication unit. A first gateway, connected to said first telephone network, converts each frame received from said first telephone network into one or more data packets. A first routing device, coupled to said first gateway and said data network, transmits the one or more data packets generated by said first gateway through said data network. A second routing device, coupled to said data network, receives the one or more data packets transmitted by said first routing device. A second gateway, coupled to said second routing device, converts the data packets received by said second routing devices into frames. One of the multiple teleconference bridges inserts the frames received from said second gateway into a teleconference hosted on said bridge.

12 Claims, 25 Drawing Sheets

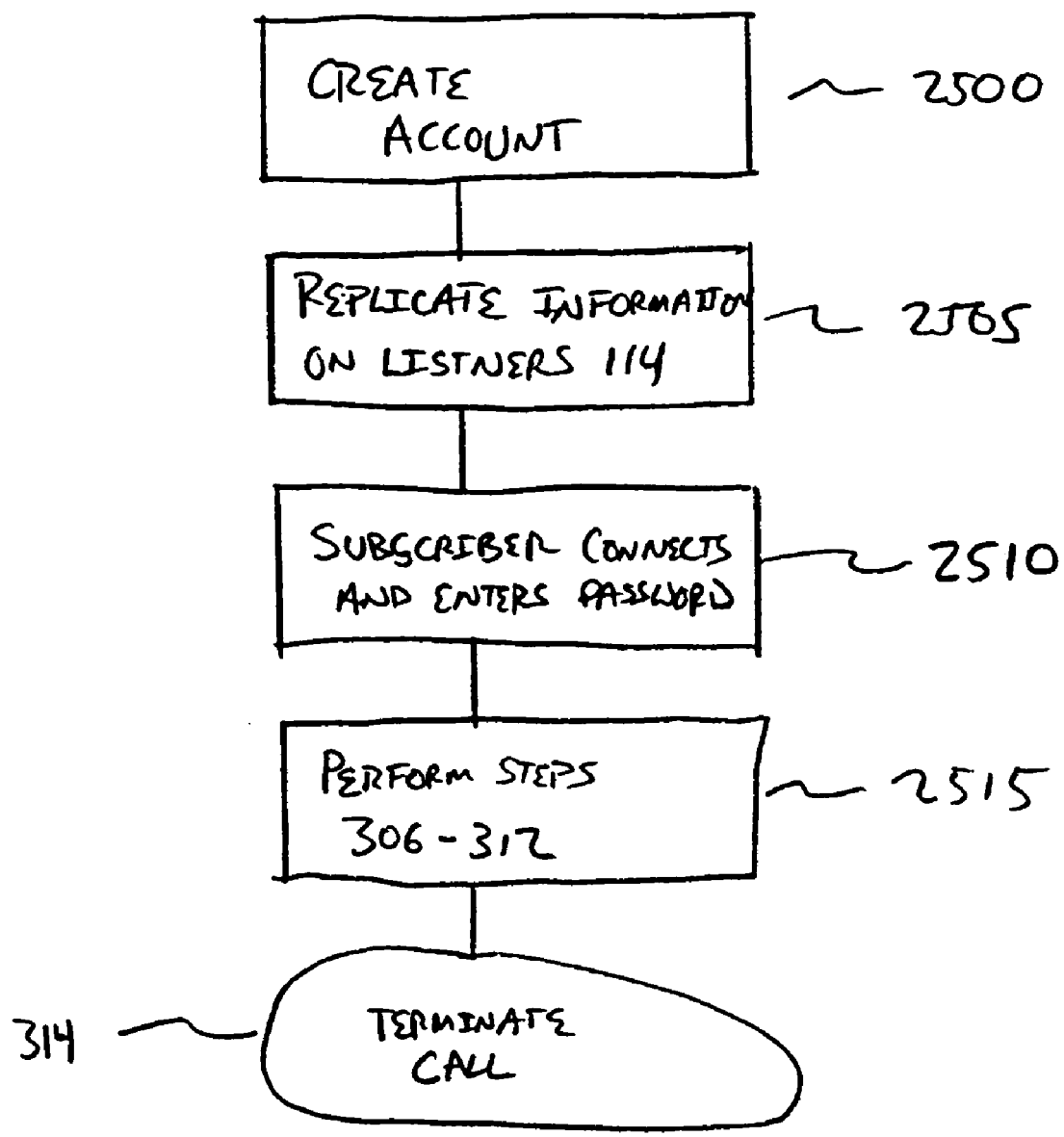

SYSTEM AND METHOD FOR ESTABLISHING AND CONTROLLING AN ON-DEMAND TELECONFERENCE BY A REMOTE COMPUTER

This application claims the benefit of U.S. Provisional Application No. 60/375,869, filed Apr. 26, 2002 and is a continuation-in-part of co-pending U.S. application Ser. No. 10/121,409, filed on Apr. 12, 2002, which claims priority from U.S. Provisional Application No. 60/283,870, filed Apr. 13, 2001, all of which are hereby incorporated by reference in their entirety.

FIELD OF THE INVENTION

The present invention relates generally to a computer and software system and, more particularly, to a system and method for establishing and controlling an on-demand teleconferencing system by a remote computer.

BACKGROUND OF THE INVENTION

Numerous teleconferencing systems provide a number of different methods for establishing a telephone conference call or teleconference between multiple individuals. One of the most common methods for establishing a teleconference requires the teleconference host or sponsor (i.e., the individual who desires to have a teleconference), to schedule the teleconference with a human teleconference operator in advance of the teleconference. The operator uses a maintenance and administrative terminal (sometimes called a "MAT") to program a teleconference bridge, connected to the public switched telephone network ("PSTN"). The operator typically uses the MAT to provide the bridge with the beginning and ending time (or length) of the teleconference, the number of attendees (including the host and the guests) and one or more uniquely assigned passcodes. The operator then provides the host with a host passcode and a guest passcode for the teleconference and a telephone number that is associated with the bridge. The teleconference host must then distribute the guest passcode, telephone number and start time to the various guests.

Some systems minimize the need for a human operator to perform administrative tasks. A host dials a "profile access" number, which permits the host to schedule a conference, select a conference to attend, manage recorded voice segments, and perform basic administrative functions such as changing passwords. After the host has entered, via a touch tone keypad, a correct profile and password access, the host can schedule a conference. If the host wishes to schedule a conference call in the future, the host enters the date, time, length and number of attendees. The system determines whether or not sufficient resources are available at that requested date and time considering the length of the call and the number of attendees. If not enough resources are available, the host is asked to reschedule the conference call. Otherwise, the system prompts the host for the conference call ID number. The system provides an ID number. If the host wants an immediate conference, the system performs the same steps to determine availability of resources. Attendees to the teleconference can then call the bridge and input the ID number. If the ID number is proper, the attendee is added to the conference call.

Some teleconferencing systems have provided a conferencing feature wherein the host is able to create a list containing attendees' telephone numbers in a memory along with a conferencing code. The host must pre-enter in the telephone number of each attendee in the memory. To establish a conference call, the host enters the conference code. Circuitry detects the conferencing code and automatically calls and conferences together each attendee at the telephone numbers stored in memory.

Unfortunately, current teleconferencing systems provide a limited number of control interfaces to teleconference sponsors and conferees, such as Dual-Tone Multifrequency (DTMF) and operator controls only.

SUMMARY OF THE INVENTION

According to one embodiment of the present invention, a teleconference system is disclosed comprising a teleconference bridge having a plurality of ports for establishing a teleconference between two or more attendees. A maintenance and administration terminal is connected to said bridge, for generating one or more transaction records in response to a change in the status of any port on said teleconference bridge. A first server is connected to said maintenance and administration terminal, for receiving the one or more transaction records generated by said maintenance and administrative terminal and storing the one or more transaction records in a first database. A second server is connected to said first server having an interface operable to send the one or more transaction records stored in said first database, to a remote computer.

According to an alternate embodiment of the present invention, a teleconference system is disclosed comprising a teleconference bridge having a plurality of ports for establishing a teleconference between two or more attendees.

A maintenance and administration terminal is connected to said bridge, for generating one or more transaction records in response to a change in the status of any port on said teleconference bridge. A first server is connected to said maintenance and administration terminal, for receiving the one or more transaction records generated by said maintenance and administrative terminal and storing said one or more transaction records in a first database. A second server is connected to said first server, for receiving the one or more transaction records stored in said first database and storing the one or more transaction records in a second database. A third server is connected to said second server, having an interface operable to send the one or more transaction records, stored in said second database, to a remote computer.

An alternate embodiment of the present invention discloses a method of controlling a teleconference system bridge having a plurality of ports for establishing a teleconference between two or more attendees by generating one or more passcodes in a remote computer. The generated passcodes are transmitted from said remote computer to a first server via a remote connection. The one or more passcodes are stored in a first database connect to said first server. The one or more passcodes are copied to a second database connected to a second server. A user passcode received at a first port of said teleconference bridge is compared to the one or more passcodes stored in the second database. A teleconference is established between two or more attendees when the user passcode matches at least one of the one or more passcodes stored in the second database.

An alternate embodiment of the present invention discloses a method of monitoring a teleconference bridge having a plurality of ports for establishing a teleconference between two or more attendees by generating one or more transaction records in response to a change in the status of any port on said teleconference bridge. The one or more transaction records are stored in a first database connected to a first server. The one or more transaction records stored in said first database are copied to a second database connected to a second server. In response to a user command received from a remote computer, at least one of the one or more transaction records stored in the second database are transmitted to the remote computer via a remote connection.

The novel architecture of the present invention also allows a user to control most aspects of teleconference bridge, including, without limitation, the creation of host and guest passcodes, the production of invoices, and the downloading of billing records through a highly flexible and efficient graphical user interface.

BRIEF DESCRIPTION OF THE DRAWINGS

FIG. 6 depicts the bridge status web page constructed in accordance with the present invention;
FIG. 9 depicts the customization web page constructed in accordance with the present invention;
FIG. 10 depicts the new customer web page constructed in accordance with the present invention;
FIG. 11 depicts the new department web page constructed in accordance with the present invention;
FIG. 12 depicts the new subscriber web page constructed in accordance with the present invention;
FIG. 13 depicts the bulk subscriber web page constructed in accordance with the present invention;
FIG. 16 depicts a conference detail web page constructed in accordance with the present invention;
FIG. 17 depicts the traffic feed web page constructed in accordance with the present invention;
FIG. 21 depicts the totals mode invoice display web page constructed in accordance with the present invention;
FIG. 22 depicts the printable invoice display web page constructed in accordance with the present invention;
FIG. 25 depicts the process used to control the system of the system of the present invention.

PREFERRED EMBODIMENT AND BEST MODE

Figure 1:
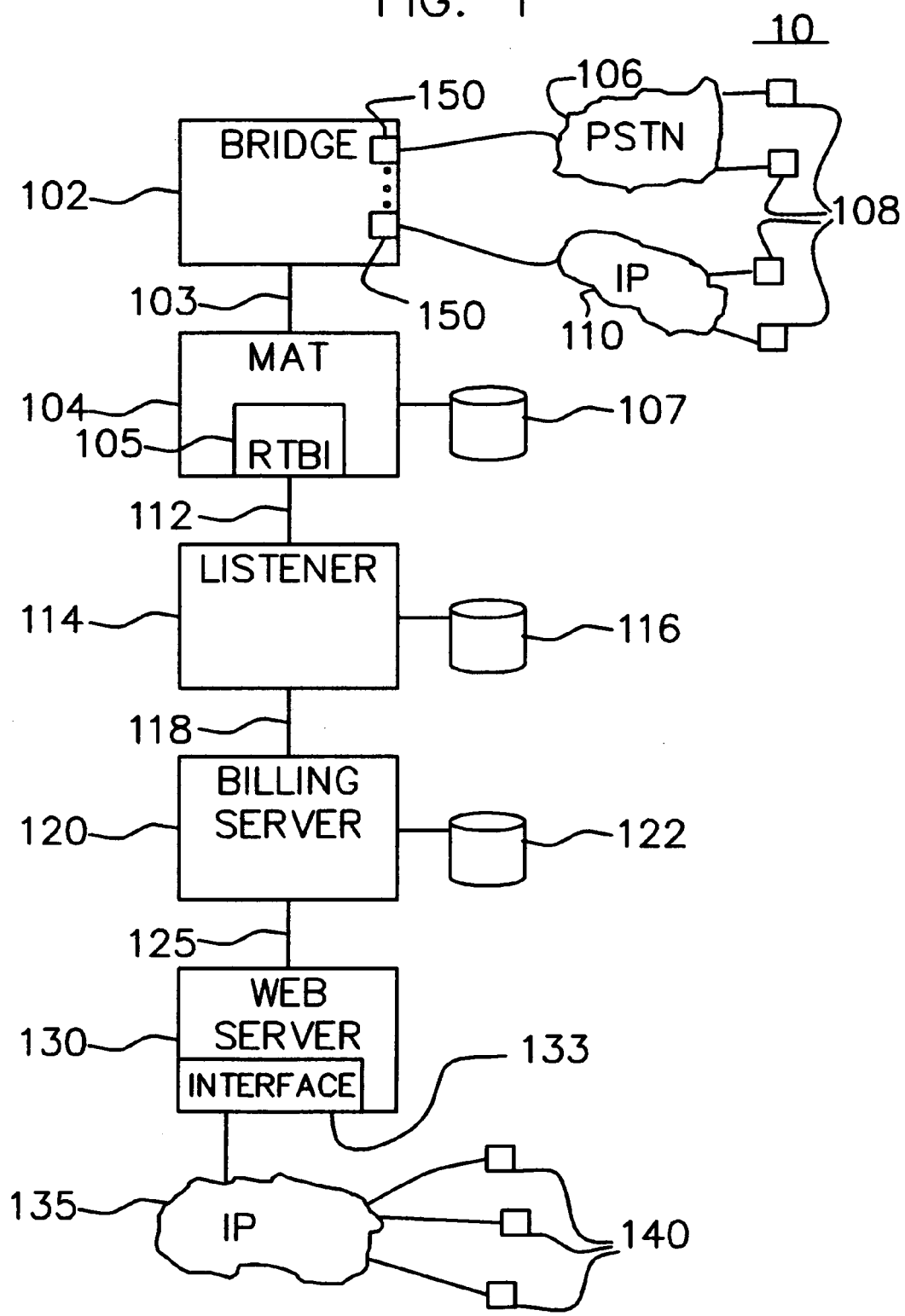
FIG. 1 is a block diagram of one embodiment of the present invention.

FIG. 1 shows a block diagram of a system 10 for establishing and controlling an on-demand teleconference on a bridge 102 by one or more remote computers 140. Teleconference bridge 102 is connected via connection 103 to a maintenance and administrative terminal ("MAT") 104 and via a plurality of ports 150 on bridge 102 to telephones 108 via the conventional Public Switched Telephone Network ("PSTN") 106. Optionally, bridge 102 may be connected via a plurality of ports 150 on bridge 102 to telephones 108 via an IP connection 110.

In the preferred embodiment, a high speed serial connection is used for connection 103. Those skilled in the art will recognize, however, that an Ethernet, parallel or other connection could be used for connection 103.

Bridge 102 is preferably a CONTEX 240 teleconferencing bridge manufactured by Compunetix, Inc. of Monroeville, Pa. having 240 or more ports. Bridge 102 provides various digital signal processing, conferencing, call flow, and other conference-related functionality that allows several individuals to participate in a telephone conference call and allows several conference calls to be in progress at any given time. Those skilled in the art will recognize that other teleconferencing bridges providing similar functionality may also be used, with departing from the spirit and scope of the present invention.

Bridge 102 is managed and controlled by MAT 104, which is implemented as software residing on a workstation or other processing platform. MAT 104 is connected to a small database 107 and executes a real-time billing interface 105, which is an application programming interface (API). As discussed in greater detail below, billing interface 105 allows information to be sent and received by MAT 104.

In the preferred embodiment, MAT 104 and billing interface 105 are a workstation or other processing platform that executes version 1.0 or higher of the Real-Time Bridge Interface which is also sold by Compunetix.

Figure 2:
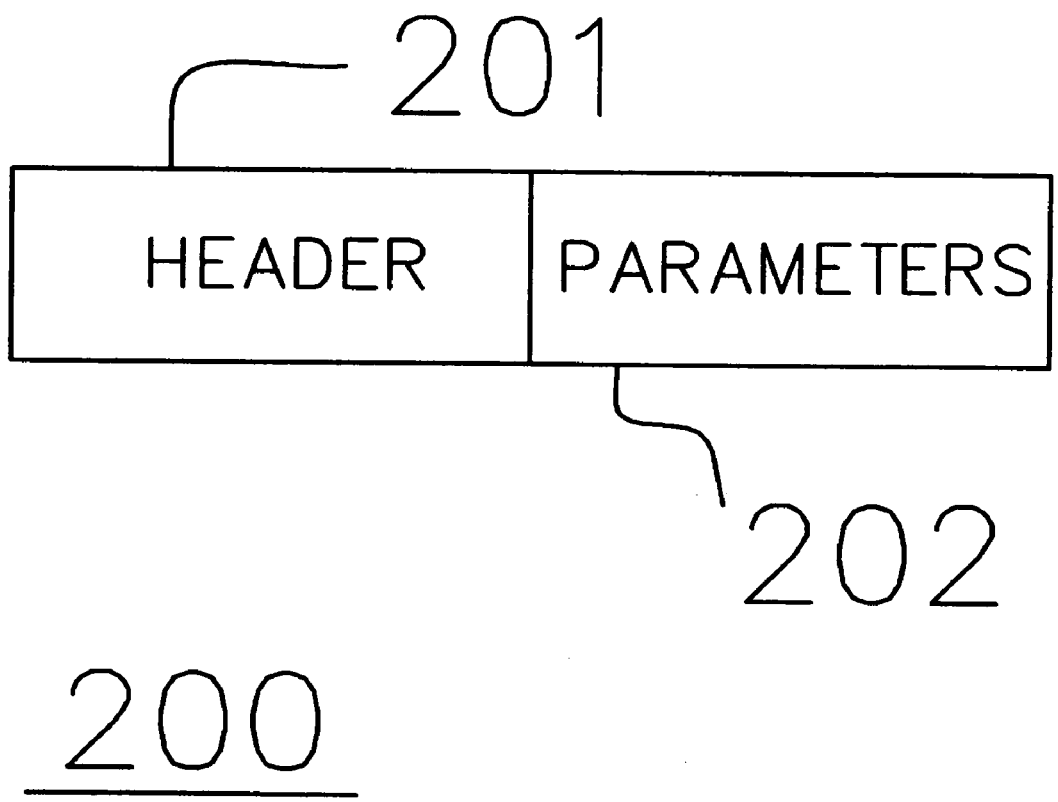
FIG. 2 depicts the format of a transaction record used by the present invention.

Referring to FIG. 1 and FIG. 2, those skilled in the art will recognize that the billing interface 105 of MAT 104 creates a transaction record 200 whenever certain activities occur on bridge 102. Each transaction record 200 is temporarily stored in database 107.

FIG. 2 shows the general format of a transaction record 200. Specifically, transaction record 200 comprises header information 201 and one or more parameters 202.

Header 201 contains information for generally categorizing transaction record 200. For example, header information 201 may indicated that transaction record 200: (1) is an inquiry as to the validity of a certain host or guest passcode, (2) is a response to a validity request indicating whether a host or guest passcode is valid or invalid, (3) contains information concerning the attributes associated with a particular passcode, (4) indicates a change to the status of a port 150 located on bridge 102, (5) is an inquiry concerning the number of stored transaction records 200 in a particular device, (6) an inquiry concerning a specific transaction record 200, (7) is intended to indicate the start time or end time of a particular conference, or (8) is intended to change user data.

One or more parameters 202 may be used within transaction record 200. Parameters 202 are the elements that actually transmits the data within a transaction record 200. Representative parameters 202 are shown in Table 1.

TABLE 1

| Parameter | Description |
|---|---|
| Port | Port 150 of bridge 102 from which the passcode was entered |
| Host Passcode | Passcode associated with host. |
| Guest Passcode | Passcode associated with guest. |
| Scheduled Date | Date for which the conference is scheduled |
| Scheduled Time | Time for which the conference is scheduled |
| Scheduled Duration | Scheduled duration of the conference |
| Conference Type | The type of conference call |
| Conference Name | Name associated with conference. |
| Conference Code | Billing code associated with the conference. |
| Scheduled Number Of Parties | Scheduled number of parties for a particular conference. |
| Connect Time Limit | Total prepaid connect time left for this code set. |

For a given conference call there might be 20 or more transaction records 200 produced by billing interface 105, for actions such as: connecting to the bridge, requesting a passcode be validated, entering the conference, hanging up, and the act of the conference being terminated, or torn down. For example, if a teleconference attendee hangs up a phone 108 connected to bridge 102, billing interface 105 will generate a transaction record 200 in which header 201 will contain information identifying that the transaction is intended to convey a change in the status of one of the ports 150 of bridge 102. Parameters 202 will contain information concerning the actual action that has occurred (i.e., a disconnect), the specific port 150 experiencing the status change, and the time the status changed occurred.

Referring again to FIG. 1, billing interface 105 sends a copy of any new transaction records 200 generated by bridge 102, via a connection 112, to a listener 114. In the preferred embodiment connection 112 is an IP connection connected to a TCP port (not shown) on Listener 114.

Listener 114 collects each transaction record 200, checks each for internal data errors, and places the transaction record 200 in a database 116. In the preferred embodiment, Listener 114, is implemented as software residing on a workstation or other processing platform and continuously screens a pre-specified port on the MAT 104 (by default TCP/IP Port 7300) for any new incoming data. Those skilled in the art will recognize that for particular applications, Listener 114 can be programmed to convert transaction record 200 to a more efficient structure or discard unneeded data in transaction record 200, thereby allowing more information to be stored.

When system 10 is initially started, billing interface 105 on MAT 104 and Listener 114 exchange 'handshaking' information (such as transmission speeds) with each other, ensuring that both systems are operating properly and recognize each other. MAT 104 and Listener 114 begin to exchange data, once the devices have established a communication session.

MAT 104 and Listener 114 continue to communicate to ensure that all the transaction records generated by bridge 102 are actually received and stored by Listener 114 in database 116. In the preferred embodiment, MAT 104 and Listener 114 will, every 10 minutes, attempt to verify the contents of databases 107 and 116 by comparing the number of transaction records 200 stored in the databases 107 and 116. If the number of transaction records 200 stored in the database 107 and 116 does not match, a resynchronization operation will begin.

During a resynchronization operation, Listener 114 will request MAT 104 to re-send all the transaction records 200 stored in database 107 and compare the newly received transaction records 200 to those stored in the database 116 of Listener 114. If Listener 114 identifies any new transaction records 200 that have not been previously stored in database 116, it will place the new transaction records 200 in database 116. Checksums are used to ensure that data is not corrupted.

After the resynchronization operation has occurred, MAT 104 and Listener 114 will attempt to re-verify the contents of databases 107 and 116 by comparing the number of transaction records 200 stored in the databases 107 and 116.

Because Listener 114 only receives and process transaction records 200 it doesn't know how a participant is connected to bridge 102 (e.g., via PSTN 106 or IP connection 110). Therefore, Listener 114 operates regardless of how an attendee is connected to Bridge 102. If different billing types are required for connections via PSTN 106 or IP 110, DNIS information can be used and analyzed as part of the billing process.

The transaction records stored in database 116 of Listener 114 are also replicated and sent to a database 122 connected to a billing server 120 via connection 118. In the preferred embodiment, billing server 120 is implemented as software residing on a workstation or other processing platform. As will be discussed in greater detail below, billing server 120 processes transaction records 200 by applying various billing rules established by users. Once the transaction records 200 are processed by billing server 120, the information can be passed to web server 130 through standard SQL ADO (ActiveX Data Object) drivers. As will be discussed in greater detail below, this enables a user to directly view the call transaction records, or summaries thereof.

A web server 130 is also connected to billing server 120 via connection 125. In the preferred embodiment, web server 130 is implemented as software residing on a workstation or other processing platform and executes a web interface 133. Web server 130 is connected via web interface 133 to the internet 135 and ultimately to remote computers 140.

A user ID and password are issued to each individual authorized to access web interface 133. The user ID and password used to access web interface 133 are separate and distinct from the host and guest passcodes used to access bridge 102. By accessing web interface 133, teleconference hosts can establish teleconferences without the need of a human operator and perform a variety of administrative functions.

When a user activates, or deactivates, a host or guest passcode using web interface 133, the information is sent to billing server 120 which transmits (replicates) the data to databases 107, 116 and 122. When a host or guest passcode is presented to bridge 102 via a telephone 108, bridge 102 can determine if the host or guest passcode is valid by having MAT 104 compare the received passcode to the valid passcodes stored in database 107. If the passcode is valid, MAT 104 instructs bridge 102 to place that call into conference.

Figure 3:
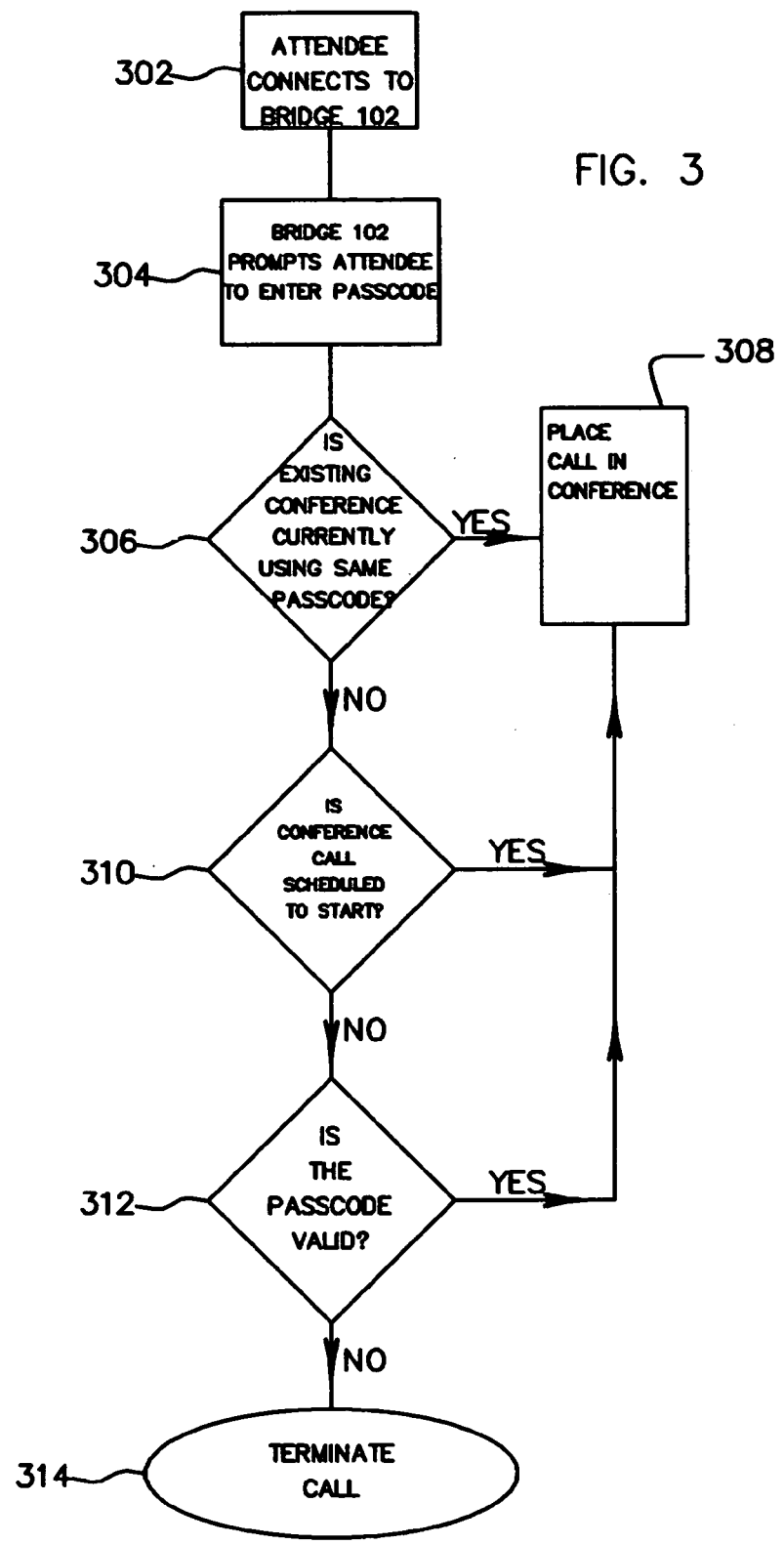
FIG. 3 depicts the process used to connect a caller to a conference call.

FIG. 3 describes in greater detail the process used by a teleconference attendee to be placed into a conference call. As shown in step 302, the attendee using a telephone 108 connects to bridge 102 via PSTN 106 or IP connection 110. As shown in step 304, upon connecting, bridge 102 prompts the attendee to enter a guest or host passcode. At step 306, bridge 102 has MAT 104 search database 107 to determine whether the passcode entered by the attendee matches the passcode to a conference call currently in progress on bridge 102. If the entered passcode matches the passcode of a conference already in progress, the attendee is placed into that conference at step 308. If the passcode does not match the passcode associated with a conference currently in progress, referring to step 310, bridge 102 has MAT 104 search database 107 to determine whether the passcode entered by the attendee matches the passcode associated with a conference that is scheduled to start around the time of the attendee's call. If the entered passcode matches the passcode of a conference that is scheduled to start around the time of the attendee's call, the attendee is placed into that conference at step 308. If the entered passcode does not match the passcode of a conference that is scheduled to start around the time of the attendee's call, referring to step 312, bridge 102 issues a query to database 116 attached to listener 114 to determine whether the entered passcode is a valid passcode. If the entered passcode is a valid passcode, bridge 102 creates a conference and the attendee is placed into that conference at step 308. If the entered passcode is not a valid passcode the call is terminated at step 314.

In the preferred embodiment, each user who is authorized to use interface 133 is given a login security level appropriate to their position in the system hierarchy. Those skilled in the art will recognize that different security level classifications or a different number of security levels can be used in a manner consistent with the teachings of the present invention. This information is stored in database 122. The security levels for various types of users are shown in Table 2.

TABLE 2

| Security Level | Type of User |
| --- | --- |
| Level 7 | System Administrator |
| Level 6 | Customer Service Manager |
| Level 5 | Customer Service Representative |
| Level 4 | Provider |
| Level 3 | Customer |
| Level 2 | Customer |
| Level 1 | Individual User |

The preferred embodiment of the present invention utilizes a hierarchical design for establishing security levels and related accounts. The top 3 security levels are intended to be used by employees of the entity controlling the present invention, while the bottom 4 levels are intended to be used by the customers of the entity controlling the present invention.

Users assigned to the highest 3 security levels are able to view various transaction records 200 stored in database 122 (or any other related information stored in database 122) that is associated with any system user having a lower security level. It is possible to place various restrictions on the particular type of information or transaction record 200 a user having a particular security level may view.

With respect to the lowest 4 security levels, a user at a given security level is permitted to access the information associated with a user at a lower security level, provided that the user at the lower security level is within the hierarchy associated with the user at the higher security level. A security level 4 or lower user is not permitted to view information associated with a user in a different hierarchy.

In the preferred embodiment, a security level 4 setting allows the greatest access to information stored in database 122 by an individual not employed by the entity controlling the present invention.

Figure 4:
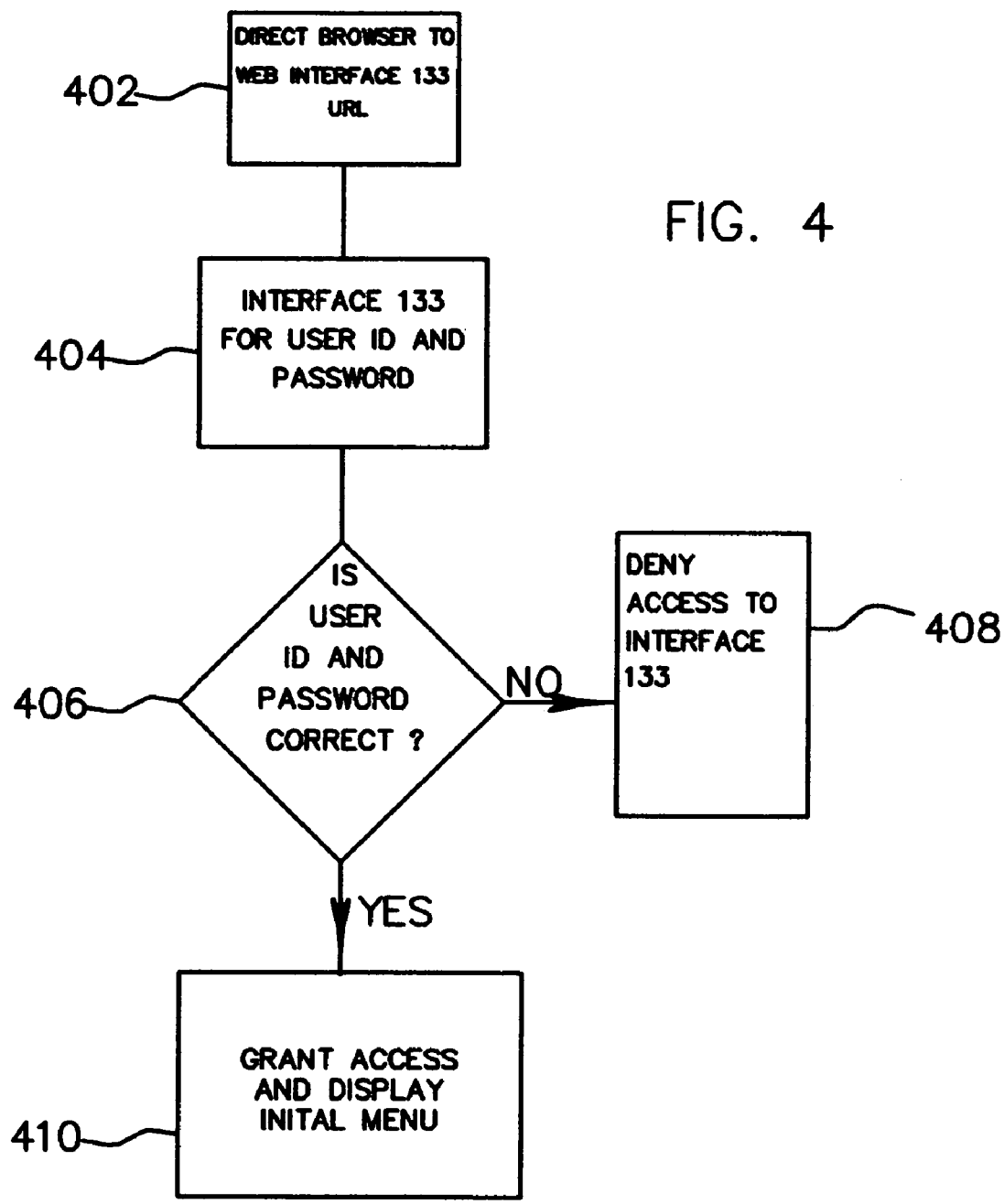
FIG. 4 depicts the process used to control a teleconferencing system via a remote computer.

FIG. 4 describes in greater detail the process used by a user to access web interface 133 by a remote computer 140. Referring to step 402, the user opens their web browser (not shown) on remote computer 140 and enters a URL for the web interface 133 into the address line of the web browser. At step 404, interface 133 prompts the user to enter a user ID and password and click on the login button at the bottom of the dialog box. At step 406, the web interface 133 compares the entered information with the information stored in billing database 122. If the information does not match, the user is denied access at step 408. If the user entered a valid user ID and password, the user will be allowed access to web interface 133 and an initial menu (not shown) having one or more of the menu categories and menu items identified in Table 3, will be displayed based on the user's security level.

TABLE 3

| Menu Category | Menu Items |
| --- | --- |
| Conferences | Conference List - Displays the current list of conferences for the month or year based on the selected filter |
| | Bridge Status - A snapshot of the activity on a given bridge automatically refreshed every 20 seconds |
| | Usage Summary - A breakdown of the number of ports 150 per day that were used, either by provider or a total number |
| System | Customers - Displays a list of individual customers |
| | Departments - Displays a list of individual departments |
| | Subscribers - Displays a list of individual subscribers |
| Providers | Information - Displays a list of individual providers |
| | Contacts - Information about an individual contact within a provider that is not a customer |
| | Traffic Feed - Displays data based on provider traffic |
| | Invoices - A default setting that lists all open invoices for a provider |
| Maintenance | My Web settings - Allows a user to set their individual settings |
| | DNIS Rates - Allows ACT to set surcharges based on DNIS |
| | Termination Providers - Displays a list of individuals who provide access into the IP system |
| | Dialout Rates - Allows ACT to specify transport rates |
| Logout | Logout - terminate access to web interface 133 |

Figure 5:
FIG. 5 depicts a conference list web page constructed in accordance with the present invention.

FIG. 5 depicts the conference list web page 501 that is displayed when the user selects the Conference List menu item. Conference list web page 501 displays, in real time, a list of conferences conducted at the users security level and below. Web page 501 defaults to the current month and year, and displays all conferences. The user can review historical conference lists and details by simply selecting the appropriate month and year in the drop-down boxes 502. The user is also given the option to switch between pages. The system can sort the view by simply clicking on the appropriate customer drop-down box 503, department drop-down box 504 and subscriber drop-down box 505. For users having a security level greater than level 4, the user can also filter teleconferences by provider, by selecting a provider from provider drop-down box 506. In the preferred embodiment, the conferences, displayed on web page 501, contain the fields identified in Table 4.

TABLE 4

| Field | Description |
| --- | --- |
| Conference ID | a unique number identifying the conference call |
| Conference Name | a value that is generated by combining the Conference ID and the name of the bridge 102 the conference was conducted on. |
| Date | the date the conference call was conducted |

TABLE 4-continued

| Field | Description |
| --- | --- |
| Start time | the conference start-time in GMT |
| End time | the conference end-time in GMT |
| Subscriber | the name of the user who hosted the conference |
| Callers | number of attendees on conference call |
| Duration | duration of conference call from the time first person joined to the time the last person disconnected |
| Connected | sum of the connection time of all participants to bridge 102 |
| Billable | sum of the billable connection time for all participants |

Figure 16:
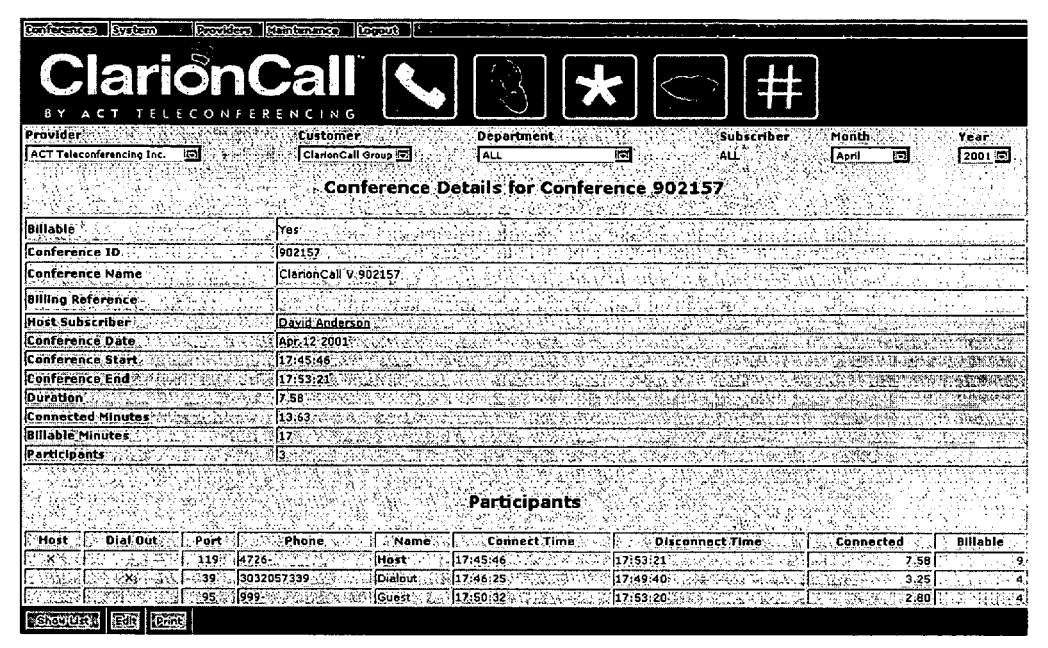

Referring to FIG. 5 and FIG. 16, a user can cause web interface 133 to display a conference detail web page 1601 by simply clicking on the conference name for the particular conference of interest. Web interface 133 will then display a summary of the specific conference information from the previous web page 501 plus specific details for each conference connection as set forth in Table 5.

TABLE 5

| Field | Description |
| --- | --- |
| Host | shows the host connection with an X |
| Dial Out | indicates the conference participant was dialed from the system |
| Port | indicates exactly what port 150 on the bridge the conference participant was on |
| Phone | shows the telephone number dialed or the DNIS number of the access gateway |
| Name | indicates the conference participant's status host/guest/dial-out |
| Blank Billing Field | this field can be used to enter information salient to the subscriber about the conference call e.g. (cost center code, matter number, charge back code, etc). The user can then click on the edit key and click on the billing reference field; type the appropriate information and click save. |

Figure 6:
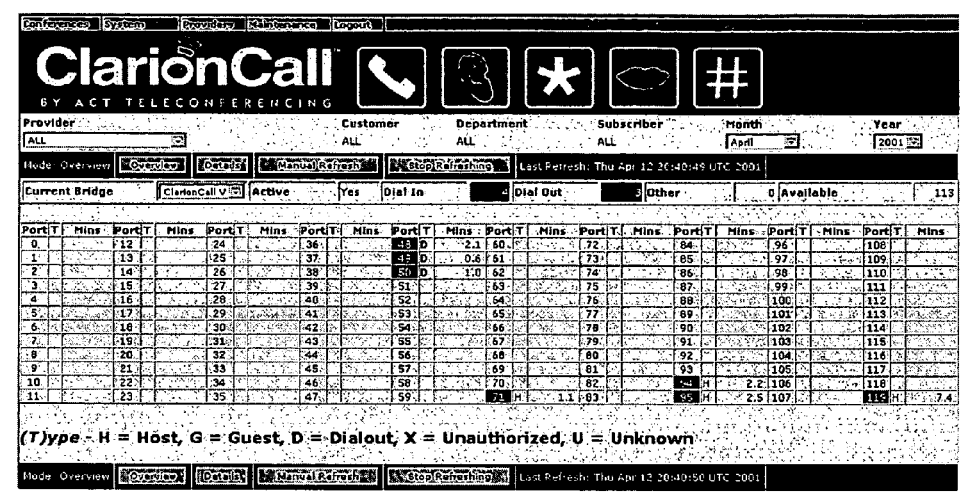

FIG. 6 depicts the bridge status web page 601 that is displayed when the user selects the Bridge Status menu item from the initial menu. Bridge status web page 601 displays a real-time view of the status of all the ports 150 being used on bridge 102. Web page 601 provides the ability to verify port 150 availability prior to creating a conference requiring a large number of ports 150 and the ability to monitor the usage load on bridge 102.

The initial view of the bridge status web page 601 is a high-level view. The status indicator label for each port 150 of bridge 601 indicates the purpose each port 150 is being used for. Additional details can be displayed by clicking on the details button 602 at the top of the page. The detailed view displays the designation (or name) of the particular port 150, conference ID, the subscriber name, the time port 150 was first used and the total amount of time port 150 was in use.

A specific customer's usage of bridge 102 can be displayed by simply clicking on the customer drop-down box 603 and selecting a specific customer. Performing this action will display the following information for a particular customer: available ports 150; type of call (dial-in/dial-out); passcode used (with a link to the subscriber's information); time connected and duration connected.

Figure 7:
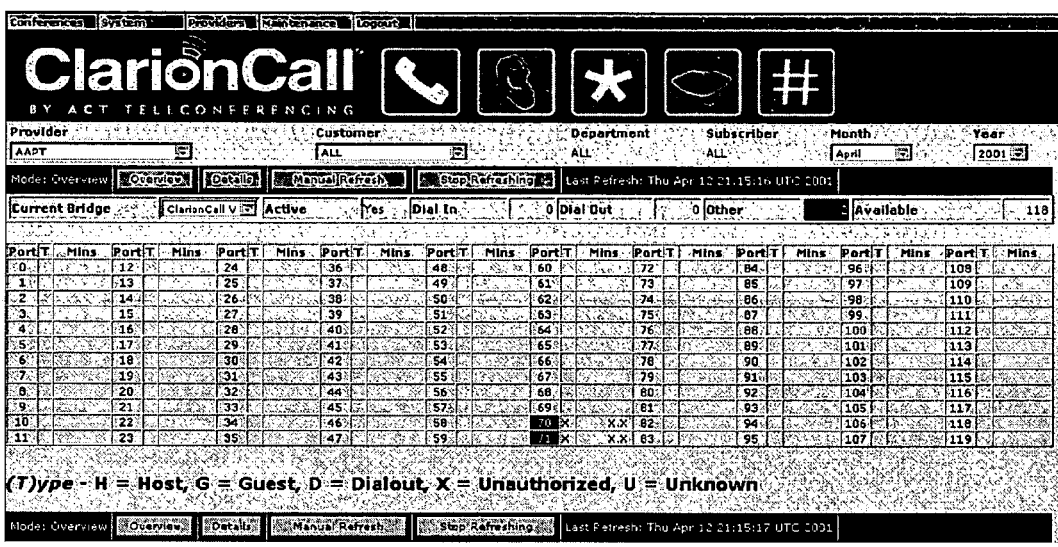
FIG. 7 depicts the customer viewing web page constructed in accordance with the present invention.

Only users with a higher security level are allowed to see details about a user having a lower security level. For example, referring to the web page 701 depicted in FIG. 7, the customer viewing web page 701, is unable to view any details concerning port 70 and port 71 as indicated by the symbol "X.X".

Figure 8:
FIG. 8 depicts the user web page constructed in accordance with the present invention.

FIG. 8 depicts a user web page 801 that is displayed when the user selects the menu item from the initial menu. Web page 801 is used for displaying: usage graphs; the number of passcodes issued; the total conferencing minutes month-to-date and annually; total conferencing revenue month-to-date and annually; percent of bridge port utilization.

The system menu has at least 3 drop down menus: providers 805, customer 806 and Department 807. By clicking on any one of menus, the user can see a summary of each level in the hierarchy. The provider drop-down menu 805 displays a summary of all customers, departments and users within the selected provider's hierarchy. In the preferred embodiment, this menu is accessible only to administrative staff with an access level of 5 or higher and provides a summary of all providers in the system. The provider ID, name, billing address information, assigned bridge and system status will also be displayed.

The customer drop-down menu 806 displays a summary of all customers within a selected hierarchy. The customers are listed alphabetically with all departments listed for each customer.

The department drop-down menu 807 displays a summary of all departments established within a selected customer. This information may be listed alphabetically by department name with the provider name and customer name as headers.

Figure 9:
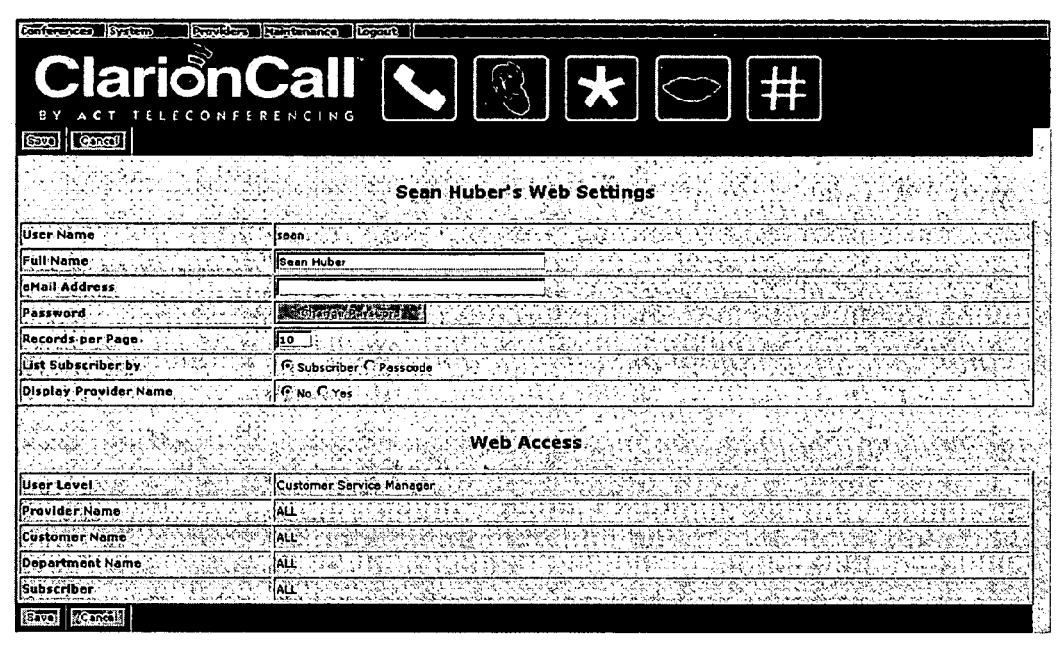

FIG. 9 depicts the customization web page 901 that is displayed when the user accessing web interface 133 selects the my web settings menu item from the initial menu. Web page 901 displays the available customization features. For example, a security level 4 user can change the customer, department and subscriber labels of the top level menus to reflect the appropriate nomenclature for each business using the present invention. Once changed, every user within that hierarchy who logs on to the system will see the new label names.

Each user can also change their password, greeting name and e-mail address. They can also change the page layout of their account (e.g., number of records displayed per page, how the subscribers are listed and if they would like the providers name listed). Any changes submitted on web page 901 will be saved in database 122 and will be effective the next time the user logs into web interface 133.

Figure 10:
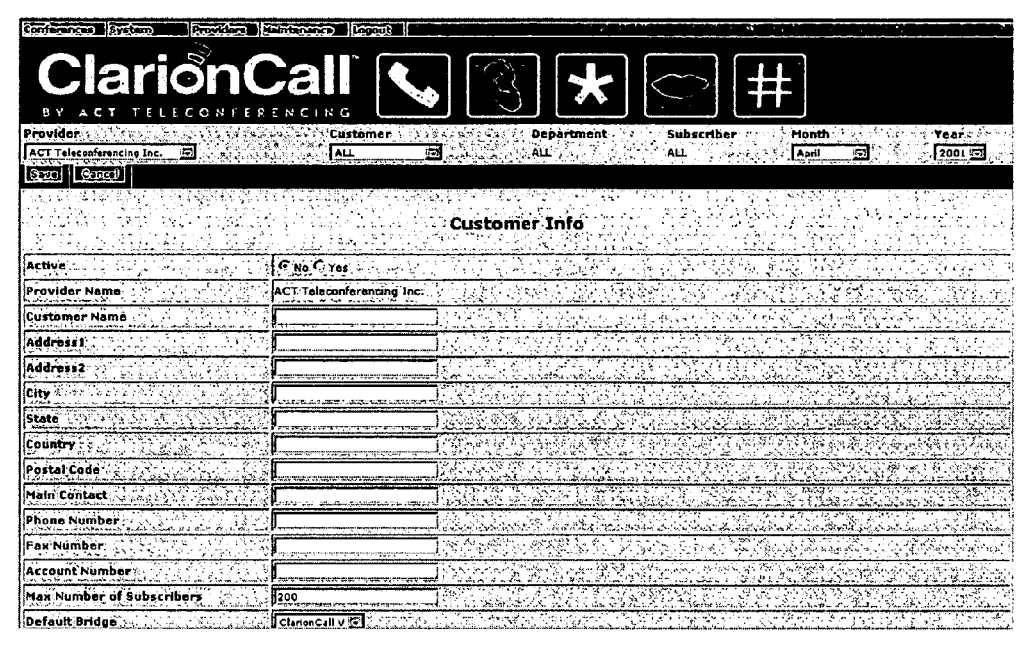

FIG. 10 depicts the new customer web page 1001 that is used to add a new customer, such as a business, to database 122. The appropriate billing and contact information is submitted to web page 1001, via interface 133. The maximum number of subscribers a customer is permitted to have at any time can also be limited by placing an appropriate value in field 1005. Once all information has been completed the person submitting the information to interface 133 clicks the save button and the information is stored in database 122.

Web page 1001 also displays relevant information for each customer such as the customer name, contact name, type of contact e.g. (technical, billing, sales, etc.), their phone number, fax number, city, state and country.

Figure 11:
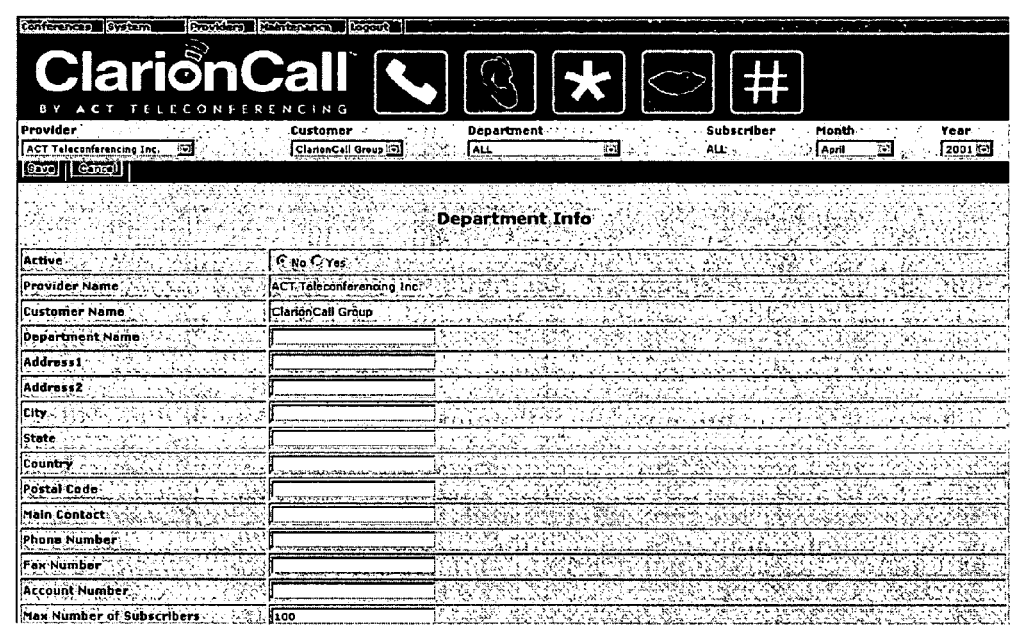

FIG. 11, depicts a new department web page 1101 that is used to add information for a new department to database 122. Once the customer information has been stored in database 122, one or more new departments may be added to database 122 by submitting a completed new department web page 1101 to interface 133.

Figure 12:
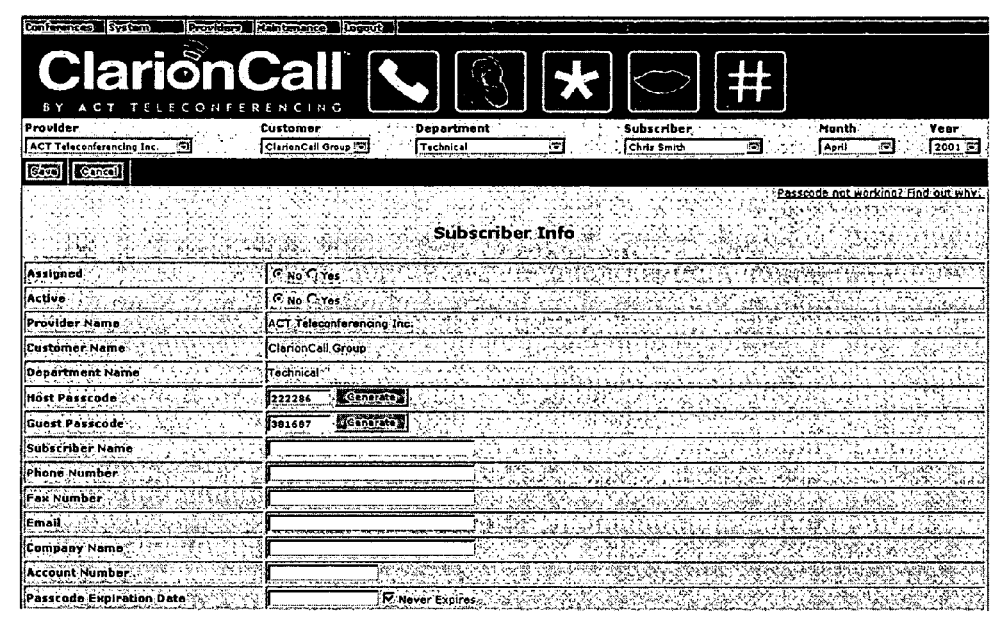

FIG. 12 depicts a new subscriber web page 1201 that is used to add a new subscriber to database 122. One or more new subscribers can be added to database 122 by submitting a new subscriber web page 1201 to database 122, via web interface 133.

Figure 13:
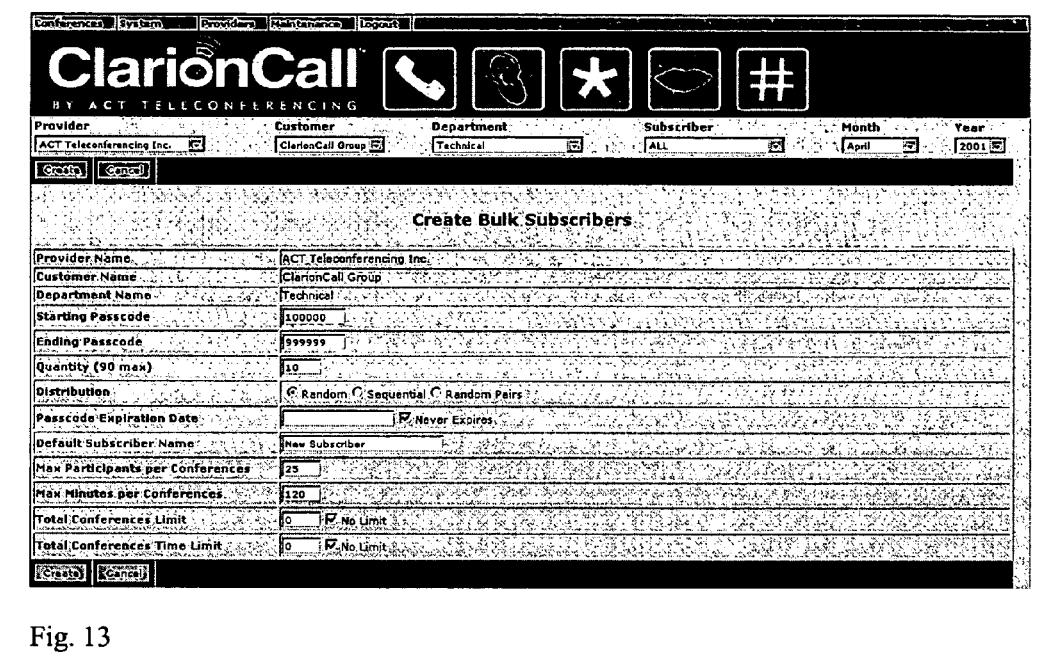

FIG. 13 depicts a create bulk subscriber web page 1301 that is used to quickly add information concerning a number of subscribers to database 122. Web page 1301 is used to support a reservation-less unattended conferencing platform.

Passcodes are typically generated in pairs, host and guest. By entering a host passcode into bridge 102 from telephone 108, a conference can be initiated, administrative functions can be performed and billing for the conference commences.

In addition, a user can access the detail call records for any customer, department, or subscriber below them in the hierarchy. The user can also activate, deactivate any level within the hierarchy thereby activating, deactivating all host/guest passcodes issued at and below that level.

Web page 1301 can be used to: create individual and bulk subscriber accounts; activate and deactivate passcodes; restrict the usage to predetermined limits; enable special conference feature by passcode; and set expiration dates of the passcodes. Generating passcodes is a powerful feature of the system. In the preferred embodiment only users having a security level 3 or greater authorization are permitted to create passcodes. In creating a host/guest passcode pair, the features identified in Table 6 can be assigned to any given user and stored in database 122.

TABLE 6

| Category | Features |
| --- | --- |
| Host Information | Passcode (this can be randomly selected or specifically requested, if available) |
| | Subscriber name |
| | Account expiration date |
| | Telephone number |
| | FAX number |
| | Email address |
| | Company name |
| | Account number |
| Passcode Features | Talk/listen mode |
| | Entrance tones |
| | Exit tones |
| | Record participant names |
| | Play custom greeting message |
| Account limits | Maximum participants per conference |
| | Maximum minutes per conference |
| | Total number of conferences allowed |
| | Total conference time limit |

There are three ways passcode numbers can be assigned to each user using web page 1301. First, a random passcode can be designated for each user. Second, each passcode can by selected sequentially within a given starting and ending range, depending on availability. Finally the host and guest passcodes can be selected randomly.

Once bulk passcodes are created, a customer level user might wish to assign and activate bulk passcodes by using spreadsheet software or another third-party application. This is facilitated by downloading the passcodes to remote computer 140, from database 122, via web server 130 and interface 133. Passcodes can be downloaded in comma-delimited format to a the remote computer 140, modified, and returned to database 122. This eliminates the need to activate and assign passcodes one by one, especially if hundreds of passcodes are being generated.

Figure 14:
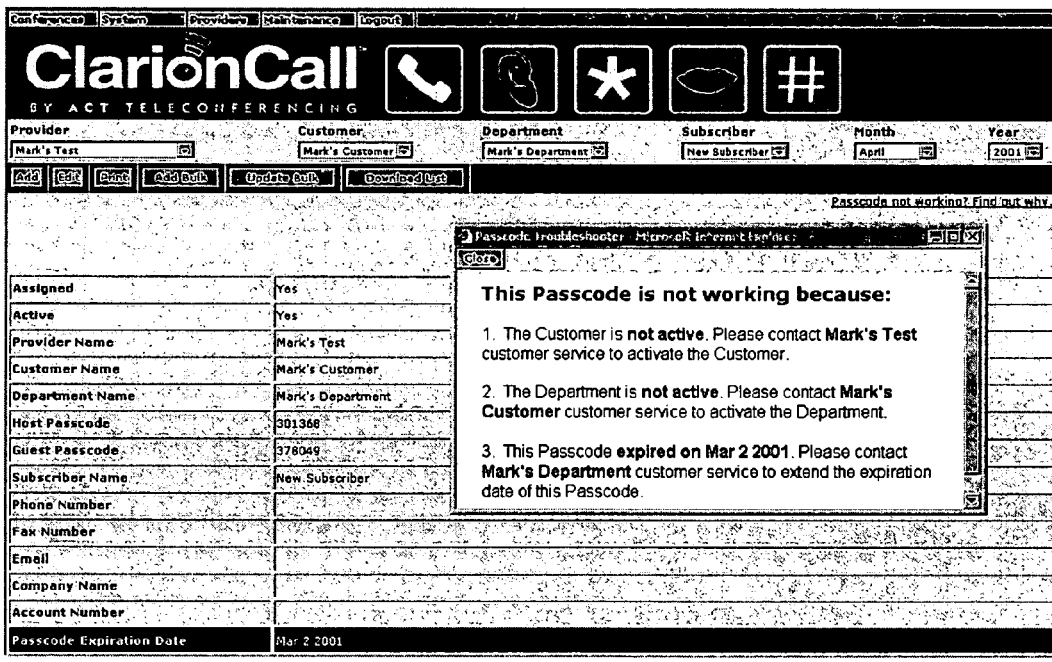
FIG. 14 depicts the passcode troubleshooting web page constructed in accordance with the present invention.

FIG. 14 depicts the passcode troubleshooting web page 1401 feature. By submitting a passcode on this web page to interface 133, web server 130 will analyze the submitted passcode and display a message in window 1405 indicating the reason why the passcode is not valid (e.g., the account is expired, the maximum number of conferences has been reached, the passcode is not activated, the user is not activated). Those skilled in the art will recognize that when managing large numbers of subscribers, it is more efficient to have the system determine the cause of potential problems with a passcodes.

Figure 15:
FIG. 15 depicts the subscriber status web page used in accordance with the present invention.

Billing server 120 cycles through a checklist of items to check to determine the cause of a problem. If any of these items are returned as 'true' a message is compiled and displayed in a pop-up window 1405. This window 1405 might contain one or more elements that need to be corrected before a passcode can be used again. FIG. 15 depicts a subscriber status web page 1501 in which, passcodes that are expired, unassigned or inactive are displayed in red in column 1505.

Figure 17:
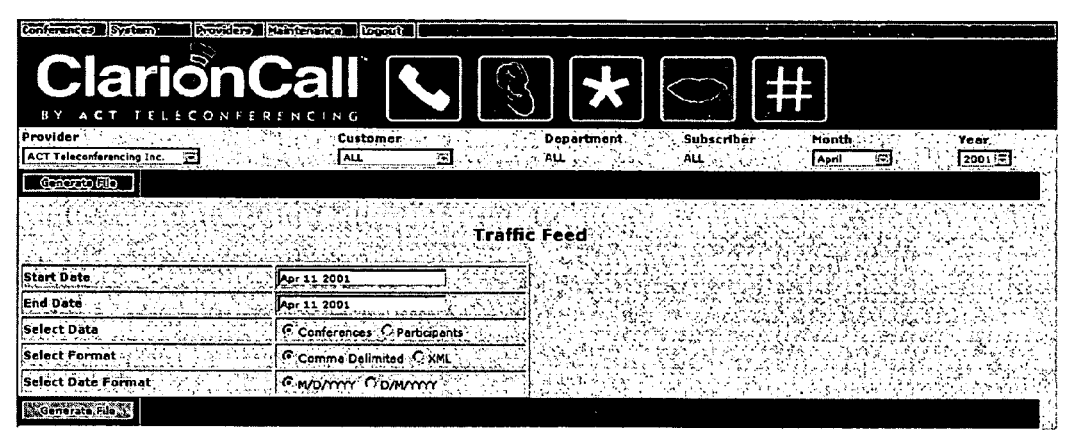

FIG. 17 depicts the traffic feed web page 1701 which is valuable to commercial teleconferencing service providers that resell bridge conferencing services and must be able to quickly retrieve billing information from database 122. Web page 1701 allows information to be downloaded from database 122 to remote computer 140 based on: the date range of conference activity; the type of billing record (Conferences or Participants). In addition, the file format (Comma Delimited or XML) and the date format of the information to be downloaded may be specified.

In the preferred embodiment, the data may be displayed and downloaded in two data formats, Conference and Participant. The data is arranged in a one-to-many format, one conference with many participants. Most commercial service providers need to differentiate between the two in order to properly bill their respective customers for the calls.

In addition, the present invention supports the transmission and receipt of data in traditional comma-delimited format as well as XML format. In addition, billing server 120 formats the data to be downloaded to remote computer 140 in a ZIP formatted file thereby reducing download time for users with slower Internet connections.

Figure 18:
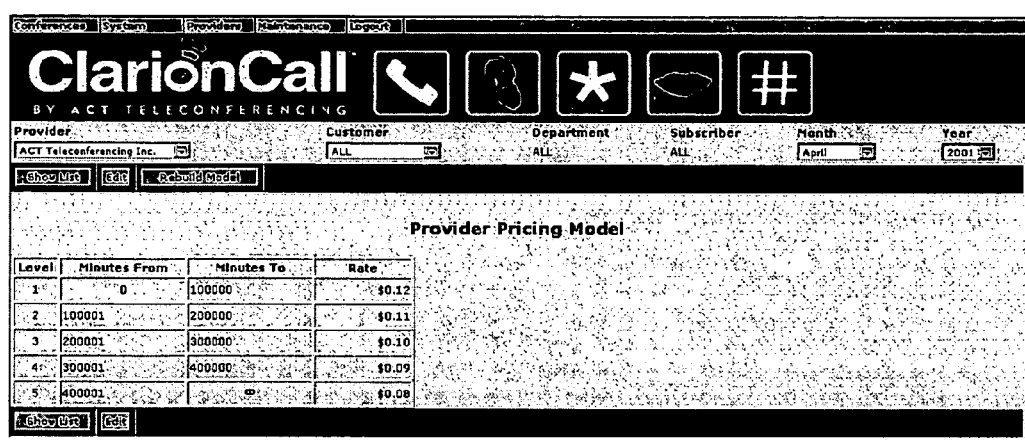
FIG. 18 depicts the pricing model display web page constructed in accordance with the present invention.
Figure 19:
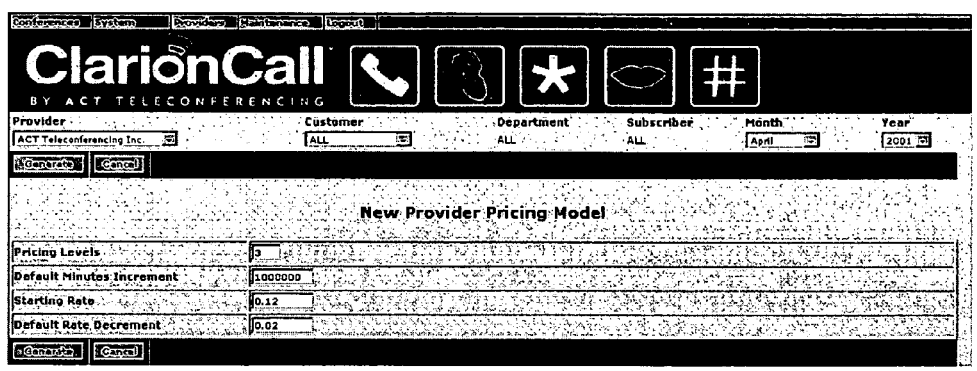
FIG. 19 depicts the pricing model entry web page constructed in accordance with the present invention.

Referring to FIG. 18 and FIG. 19, the present invention also provides online invoicing tools. This powerful feature displays a real-time preview of any invoice. After a billing cycle has been closed, invoices are also available for display via web interface 133.

A pricing module is depicted in FIG. 18 and FIG. 19. Specifically, FIG. 18 depicts a provider pricing model display web page 1801. Web page 1801 allows pricing breakpoints to be applied to transactions 200 and related billing information stored in database 122. In addition, web page 1801 allows various volume discounts to be applied.

FIG. 19 depicts a provider pricing model entry web page 1901. Web interface 133 analyzes the information entered into web page 1901 to ensure that a user doesn't incorrectly create overlapping breakpoints, or having price points that don't add up correctly. In the preferred embodiment, this option does not appear on the available menu choices for a user who does not have at least a Level 5 access.

Referring again to FIG. 19, to create a new pricing model, information is supplied to interface 133 via web page 1901: which includes the number of pricing levels; the number of conference minutes between each level; the starting rate per minute of bridge usage and the rate to decrement per level.

Figure 20:
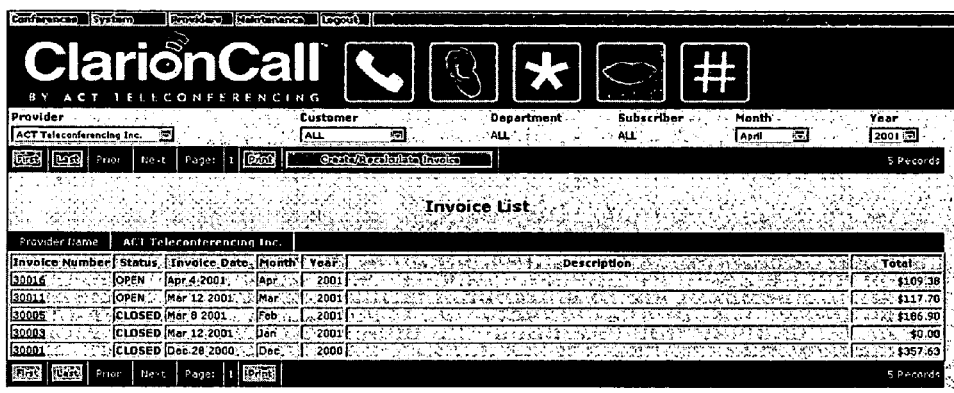
FIG. 20 depicts the invoice list web page constructed in accordance with the present invention.
Figure 21:
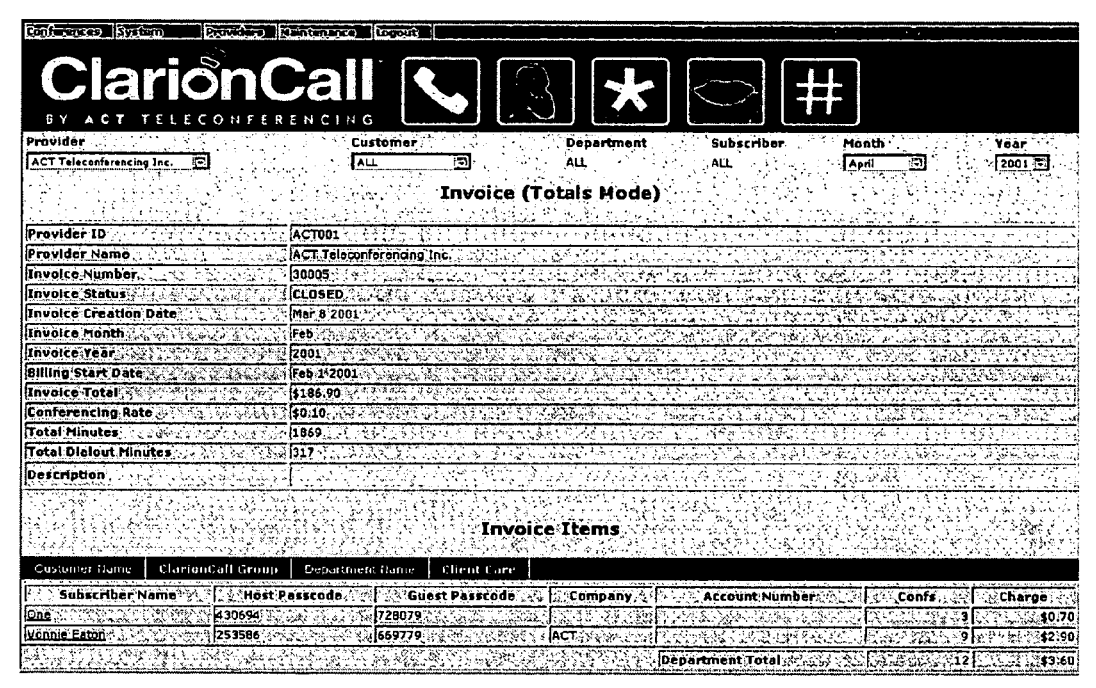
Figure 22:
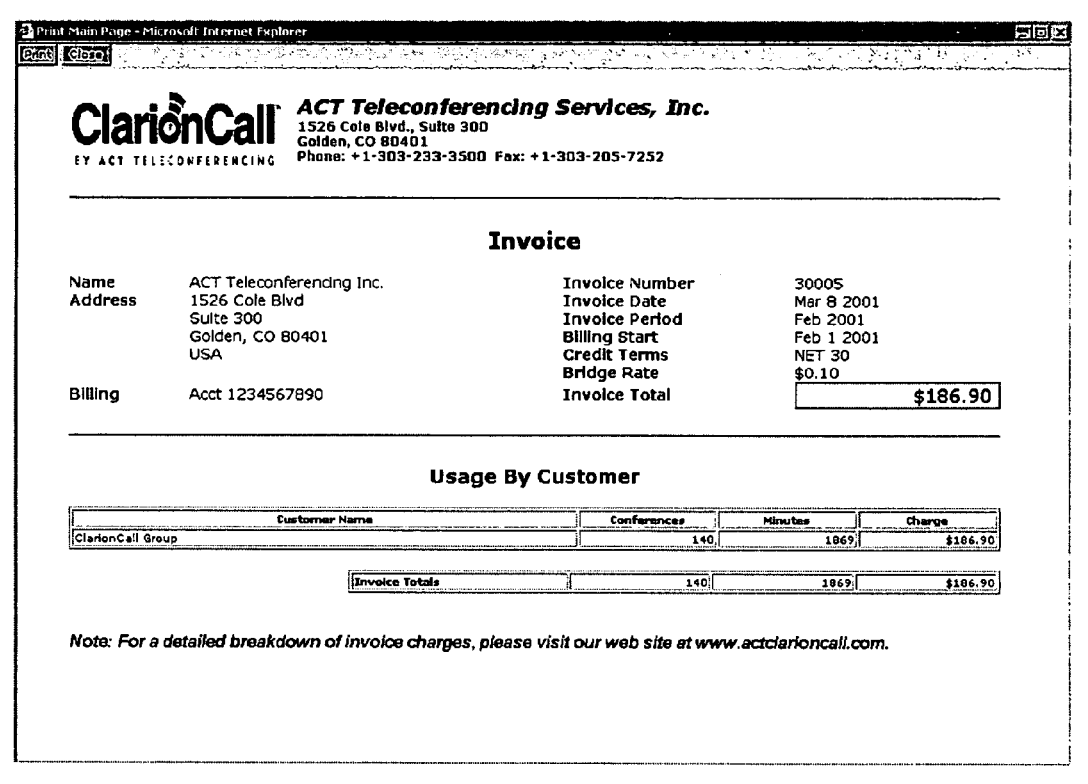

FIG. 20 and FIG. 21 depict various versions of an invoice list web page 2001 and totals mode invoice display web page 2101. Web pages 2001 and 2101 are used to create invoices such as the printable invoice 2201 displayed in FIG. 22. Web server 130 can retrieve information from database 122 for display via interface 133 upon request. In the preferred embodiment, only web users with Level 4 access are permitted to view web pages 2001 and 2101.

To generate and display an invoice, a provider must be selected from pull-down menu 2105. Web page 2001 displays a list of all invoices currently generated for the selected provider. Web page 2001 summarizes the invoice period, any description of the service, and a total amount due for each invoice. Selecting a displayed invoice number displays the selected individual in the format of web page 2101. This information includes: Invoice date; provider information; date last generated; total amount due; effective billing date; conferencing rate and dial-out and surcharge minutes.

The invoice also displays the billable activity of each customer and department levels (as created in the tiered hierarchy). Links to details of the sub-levels are provided.

Those skilled in the art will recognize that printing from a web browser can often generate unpredictable output. Graphics, inconsistent page breaks and browser overhead often prevent users from printing formal documents from the web.

The present invention offers a solution in providing printable page windows. Pressing the Print button from anywhere in the application brings up a pop-up window (not shown) with a printer-friendly version of the page or report. The same holds true for invoices, such as the printable invoice 2201 displayed in FIG. 22.

The present invention also automates the traffic retrieval process. A customer isn't restricted to manually downloading traffic files from a web page, rather, the ability to automate this process between a customer's billing engine and the present invention is provided as follows.

Using an HTTP request, a customer can request data, for a specific time period, from database 122 to be downloaded to remote computer 140. An SSL connection is established between the remote computer 140 and the web interface 133 to provide security. Once the request is made, an Active Server Page (ASP) page (residing on web server 130) makes a connection to the database 122, runs a query, and passes the data back to remote computer 140 via an HTTP data stream.

Web interface 133 also provides an automatic traffic feed option. Additional parameters must be provided in order for the request to be processed by web server 130. The following Table 7 is a list of both required and optional parameters.

TABLE 7

| Parameter | Description |
|---|---|
| User | REQUIRED - Contains the username that is making the request. This user must already exist in the system prior to making the request. This is the same username that is used to access the web interface 133. The username is not case sensitive: |
| Pass | REQUIRED - Contains the password associated with the username. While the original password is case sensitive, its encrypted string is not. The password is the only parameter that must be encrypted. The purpose of encrypting the password is to prevent unauthorized access web interface 133 by individuals obtaining the URL (from a browser's history for example). In the preferred embodiment, the password must be encrypted using the following steps:<br>1. Convert each character to its ASCII value<br>2. Subtract 25 from each value<br>3. Subtract the position of each value (starting with 1) from each value<br>4. Convert each resulting value to HEX<br>5. Reverse the final string |
| StartDate | OPTIONAL - The starting date of the range of data being requested. If not present or an invalid date is provided, the date one day prior to the current date will be used. Must be in the following format M/D/YYYY. |

TABLE 7-continued

| Parameter | Description |
|---|---|
| EndDate | OPTIONAL - The ending date of the range of data being requested. If not present or an invalid date is provided, the starting date will be used. If the StartDate and EndData parameters are the same, only one day's data will be returned. Must be in the following format M/D/YYYY. |
| Type | OPTIONAL - The type of data being requested. The only valid values are "C" to request a list of conferences and "P" to request a list of participants. If not present or an invalid value is provided, "C" will be used. |
| Format | OPTIONAL - The format of the data being returned. The only valid values are "Comma" and "XML". If not present or an invalid value is provided, "Comma" will be used and the data will be returned in comma-delimited format. If "XML" is used, the Type parameter will be ignored because the returned data will contain both conferences and their participants is a hieratical structure. |
| Date-Format | OPTIONAL - The format of the date field being returned. The only valid values are "US" and "NonUS". If not present or an invalid value is provided, US will be used. When set to US, the returned date fields will be in M/D/YYYY format. When set to NonUS, date fields will be formatted using D/M/YYYY. |

When needed, web server 130 will return errors in place of data. The following Table 8 identifies a list of possible error messages and their causes.

TABLE 8

| Error Message | Cause |
|---|---|
| Invalid Username | Either no username was provided or the username was not found in the database. |
| Invalid Password | Either no password was provided or the password did not match the user's password when decrypted. |
| No Data | No data was available for the date range specified in the request. |

Referring again to FIG. 1, those skilled in the art will recognize that because MAT 104, listener 114, billing server 120 and web server 130 are preferably implemented as software residing on a workstation or other processing platform, it is possible to combine or rearrange the functionality of the various devices. For example, listener 114 could be eliminated, and billing server 120 programmed to implement some or all of the functionality of listener 114. Furthermore, those skilled in the art will recognize that billing server 120 and web server 130 can be combined and executed on a single general workstation.

Similarly, FIG. 1 identifies several connections between various components. For example, Internet 135 is described as connecting web server 130 to remote computer 140. Those skilled in the art will recognize that other data connections, such as a circuit based connection, could be substituted for internet connection 135.

Figure 23:
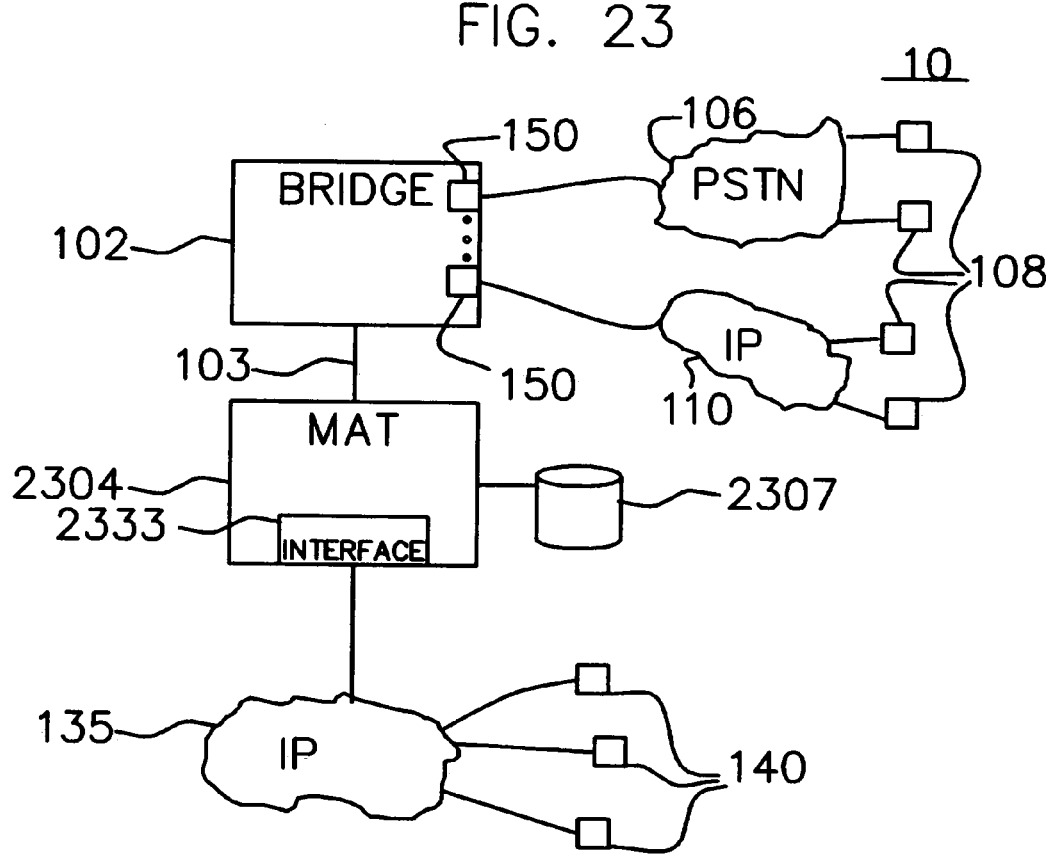
FIG. 23 depicts an alternate embodiment of the present invention.

Other configurations are possible. For example, FIG. 23. discloses an alternative embodiment of the present invention. Components having the same function as described in FIG. 1 have retained the same numerical identification. FIG. 23 discloses, the use of a combined MAT 2304 connected to bridge 102, combined database 2307 and internet 135 via interface 2333. Combined MAT 2304 contains the functionality of MAT 104, listener 114, billing server 120 and web server 133. Those skilled in the art will recognize that the use of combined MAT 2304 reduces the costs associated with multiple devices. Such a configuration, however, may be less reliable because of lack of redundant databases and workstations.

Figure 24:
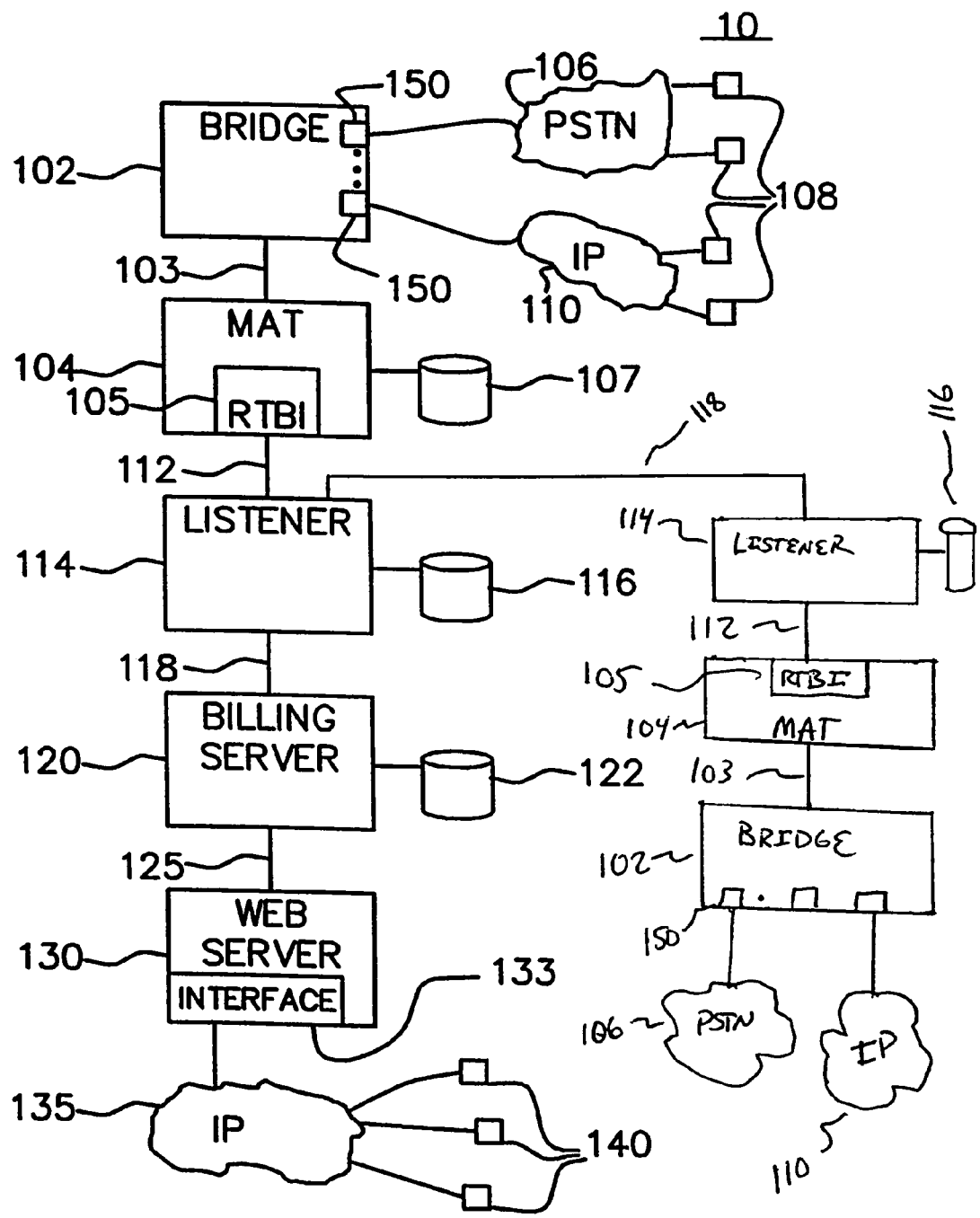
FIG. 24 depicts an alternate method and embodiment of the present invention.

Another embodiment, shown in FIG. 24 discloses a method and configuration for controlling multiple bridges 102, by using multiple listeners 114. Components having the same function as described in FIG. 1 have retained the same numerical identification. In this particular embodiment, MAT 104 is connected to multiple listeners 114.

FIG. 24 and FIG. 25 describes in greater detail the process used to control the system 100 of the present invention. As shown in step 2500 a user accesses system 10 to create an account for an attendee and either assigns or has system 10 automatically create appropriate host or guest passcodes for each user. At step 2505, this information is replicated to the listeners 114 connected to MAT 104. At step 2510, the attendee using a telephone 108 connects to bridge 102 via PSTN 106 or IP connection 110 and upon connecting, bridge 102 prompts the attendee to enter a guest or host passcode.

Step 2515, is similar to steps 306 through 312 described in FIG. 3. Specifically, bridge 102 has the MAT 104 that is connected to it search its corresponding database 107 to determine whether the passcode entered by the attendee matches the passcode to a conference call currently in progress on that bridge 102. If the entered passcode matches the passcode of a conference already in progress, the attendee is placed into that conference. If the passcode does not match the passcode associated with a conference currently in progress, the bridge 102 has the MAT 104 connected to it search its database 107 to determine whether the passcode entered by the attendee matches the passcode associated with a conference that is scheduled to start around the time of the attendee's call. If the entered passcode matches the passcode of a conference that is scheduled to start around the time of the attendee's call, the attendee is placed into that conference. If the entered passcode does not match the passcode of a conference that is scheduled to start around the time of the attendee's call, bridge 102 issues a query to database 116 attached to the listener or listeners 114 connected to the MAT 104 that is connected to the bridge 102 making the request, to determine whether the entered passcode is a valid passcode. If the entered passcode is a valid passcode, bridge 102 creates a conference and the attendee is placed into that conference. If the entered passcode is not a valid passcode the call is terminated at step 314.

Although the present invention has been described in connection with bridge 102 that is connected to telephones 108, those skilled in the art will recognize that the present invention can be used in connection with a bridge suitable for video conferencing without departing from the scope and spirit of the present invention.

Those skilled in the art will recognize that the present invention provides several advantages including improved efficiency, scalability, and flexibility. For example, operations staff no longer need to download billing files, delays in data retrieval are eliminated, and it is no longer necessary to write custom import routines for reading comma delimited bridge files. For distributed systems, data can be collected locally, then sent to a central database for invoicing.

While the preferred embodiment of the present invention uses some hardware and software provided by Compunetix, those skilled in the art will recognize that the present invention can be used in connection with other bridges and data formats. Conferencing data can be processed from virtually any source and stored in a central location.

In the foregoing description, for purposes of explanation, numerous specific details have been set forth in order to provide a thorough understanding of the present invention. It is important to understand that the present invention may be practiced with some or all of these specific details. Conventional hardware and systems have been shown in block diagram form and process steps have been shown in flowcharts. Those skilled in the art will recognize modifications and alterations upon a reading and understanding of this specification. The present invention is intended to include all such modifications and alterations insofar as they come within the scope of the appended claims or the equivalents thereof.

We claim:

1. A teleconference system comprising:
    a plurality of teleconference bridges each having a plurality of ports for establishing a teleconference between two or more attendees accessing the ports of a single bridge;
    two or more maintenance and administration terminals, each connected to at least one teleconference bridge, for generating one or more transaction records in response to a change in the status of any port on the at least one connected teleconference bridge;
    two or more first servers, each connected to at least one of said maintenance and administration terminals, for receiving the one or more transaction records generated by the at least one of said maintenance and administrative terminals and storing the one or more transaction records in a first database; and
    a second server, connected to said first server, having an interface operable to send the one or more transaction records stored in said first database, to a remote computer.

2. The teleconference system of claim 1 wherein said second server is connected to said remote computer via a packet network.

3. The teleconference system of claim 1 wherein said second server is connected to said remote computer via a circuit connection.

4. The teleconference system of claim 1 further comprising:
    a second database connected to said maintenance and administrative terminal for storing one or more passcodes.

5. The teleconference system of claim 4 wherein said remote computer is capable of changing at least one of the one or more passcodes stored in said second database.

6. The teleconference system of claim 1 wherein the teleconference established between the attendees is an audio conference.

7. The teleconference system of claim 1 wherein the teleconference established between the attendees is a video conference.

8. The teleconference system of claim 1 wherein said first server generates billing data by applying billing rules stored in said first database to the one or more transaction records received by said first server from the maintenance and administrative terminal.

9. The teleconference system of claim 8 wherein said first server stores the generated billing data in said first database.

10. The teleconference system of claim 9 wherein the interface of said second server sends the billing data stored in said first database to said remote computer via a packet network.

11. The teleconference system of claim 9 wherein the interface of said second server sends the billing data stored in said first database to said remote computer via a circuit connection.

12. The teleconference system of claim 9 wherein the first database is distributed on multiple devices.

* * * * *